United States Patent
Chen

(10) Patent No.: US 12,009,053 B2
(45) Date of Patent: Jun. 11, 2024

(54) MEMORY DEVICE AND DATA SEARCHING METHOD THEREOF

(71) Applicant: MACRONIX INTERNATIONAL CO., LTD., Hsinchu (TW)

(72) Inventor: Shih-Hung Chen, ChuTung Village, HsinChu County (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 75 days.

(21) Appl. No.: 17/841,866

(22) Filed: Jun. 16, 2022

(65) Prior Publication Data

US 2023/0410861 A1    Dec. 21, 2023

(51) Int. Cl.
*G11C 7/12* (2006.01)
*G11C 8/14* (2006.01)

(52) U.S. Cl.
CPC . *G11C 7/12* (2013.01); *G11C 8/14* (2013.01)

(58) Field of Classification Search
CPC .................................. G11C 7/12; G11C 8/14
USPC .................................................... 365/210.13
See application file for complete search history.

(56) References Cited

U.S. PATENT DOCUMENTS

| | | | |
|---|---|---|---|
| 9,436,402 B1* | 9/2016 | De Santis | G06F 3/0628 |
| 10,491,575 B2 | 11/2019 | Verzun et al. | |
| 11,410,727 B1* | 8/2022 | Hoang | G11C 16/3404 |
| 11,683,039 B1* | 6/2023 | Syed | G06F 3/0664 |
| | | | 326/38 |
| 2016/0172037 A1* | 6/2016 | Lee | G11C 16/26 |
| | | | 365/185.12 |
| 2020/0410039 A1* | 12/2020 | Inoue | G06F 7/57 |
| 2023/0198549 A1 | 6/2023 | Sharangpani et al. | |

FOREIGN PATENT DOCUMENTS

| | | |
|---|---|---|
| CN | 110059168 A | 7/2019 |
| CN | 111800375 A | 10/2020 |
| TW | 202147787 A | 12/2021 |

* cited by examiner

*Primary Examiner* — Sung Il Cho
(74) *Attorney, Agent, or Firm* — McClure, Qualey & Rodack, LLP

(57) ABSTRACT

A data search method for a memory device is provided. The data search method includes: based on a recorded compression mode, vectoring a search data to generate a search data vector, and based on the recorded compression mode, compressing the search data and a plurality of objects in a database; setting a search condition; searching the objects of the database by the search data vector to determine whether the search data is matched with the objects of the database; and recording and outputting at least one matched object of the database, the at least one matched object matched with the search data.

9 Claims, 14 Drawing Sheets

MEMORY DEVICE AND DATA SEARCHING METHOD THEREOF

TECHNICAL FIELD

The disclosure relates in general to a memory device and a data searching method thereof.

BACKGROUND

In information age, similarity analysis are widely applied in such as, text mining, data mining, copy detection, recommendation system, human face recognition, voiceprint recognition, fingerprint recognition etc.

Similarity analysis is usually implemented by vector analysis. Common vector analysis is for example but not limited by, Euclidean distance, Cosine similarity and Hamming distance etc.

For similarity analysis, object features are extracted and vectored. For example, AI training is performed on a large database. After model training, the AI model may vectorize the input human information. A well-trained model may vectorize several images of the same person into vectors having high similarity. After the search object is vectored, similarity analysis is performed on the search object and the database objects to search whether the search object is similar with the database objects.

Thus, there is a need to have a memory device and a data search method thereof, which achieves simple calculation with high analysis confidence.

SUMMARY

According to one embodiment, a data search method for a memory device is provided. The data search method includes: based on a recorded compression mode, vectoring a search data to generate a search data vector, and based on the recorded compression mode, compressing the search data and a plurality of objects in a database; setting a search condition; searching the objects of the database by the search data vector to determine whether the search data is matched with the objects of the database; and recording and outputting at least one matched object of the database, the at least one matched object matched with the search data.

According to another embodiment, a memory device is provided. The memory device includes: a plurality of word lines; a plurality of bit lines; and a plurality of memory cells on a plurality of intersections between the word lines and the bit lines; wherein a first feature vector of a first object is stored on the memory cells on a first word line among the word lines; a feature vector of a search data is input into the memory cells on the first word line of the memory device via the bit lines; logic operations on the feature vector of the search data with the first feature vector of the first object are performed to generate a plurality of first logic operation results for determining whether the search data is matched with the first object.

According to another embodiment, a memory device is provided. The memory device includes: a memory array; and a controller, coupled to the memory array, wherein the controller is configured for: based on a recorded compression mode, vectoring a search data to generate a search data vector, and based on the recorded compression mode, compressing the search data and a plurality of objects in a database, the plurality of objects of the database are stored in the memory array; setting a search condition; searching the objects of the database by the search data vector to determine whether the search data is matched with the objects of the database of the memory array; and recording and outputting at least one matched object of the database, the at least one matched object matched with the search data.

Figure 1A:
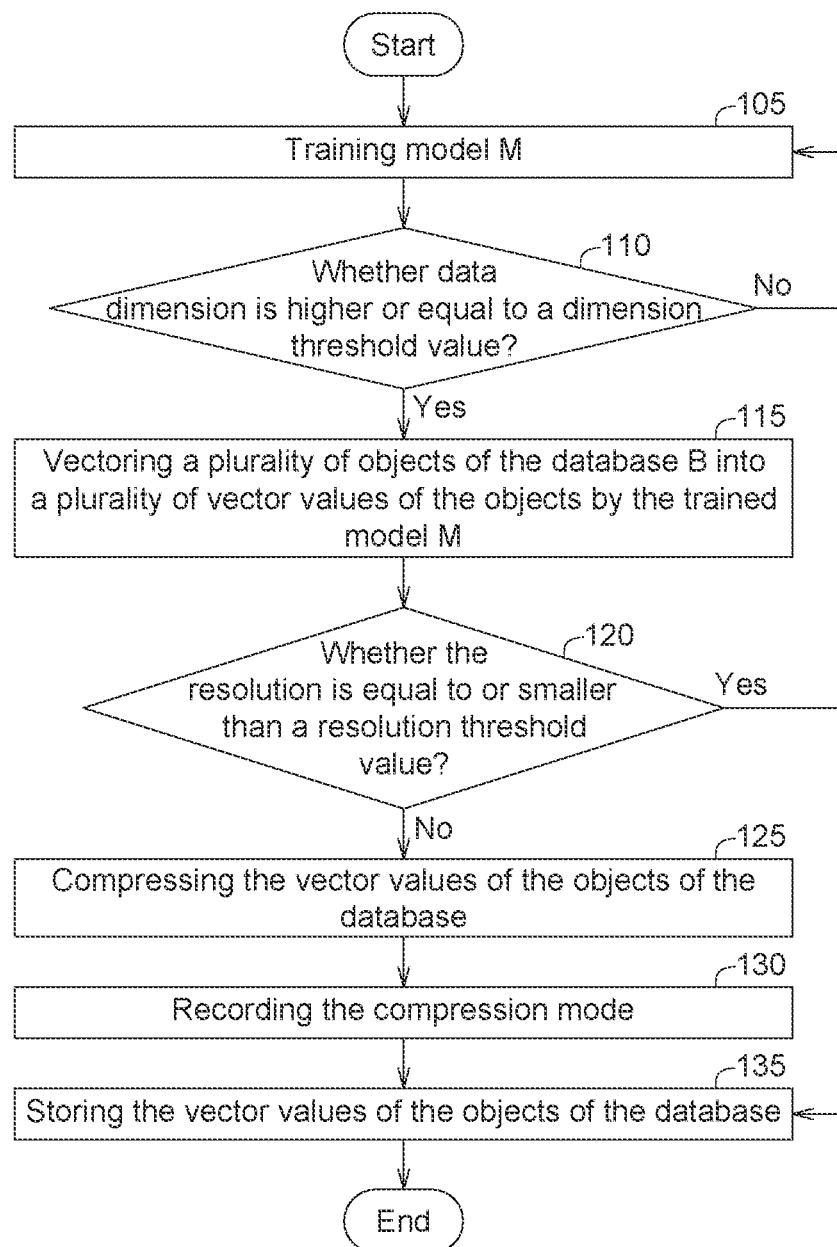
FIG. 1A shows a flow chart for configuring a vector database according to a first embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

First Embodiment

Figure 1B:
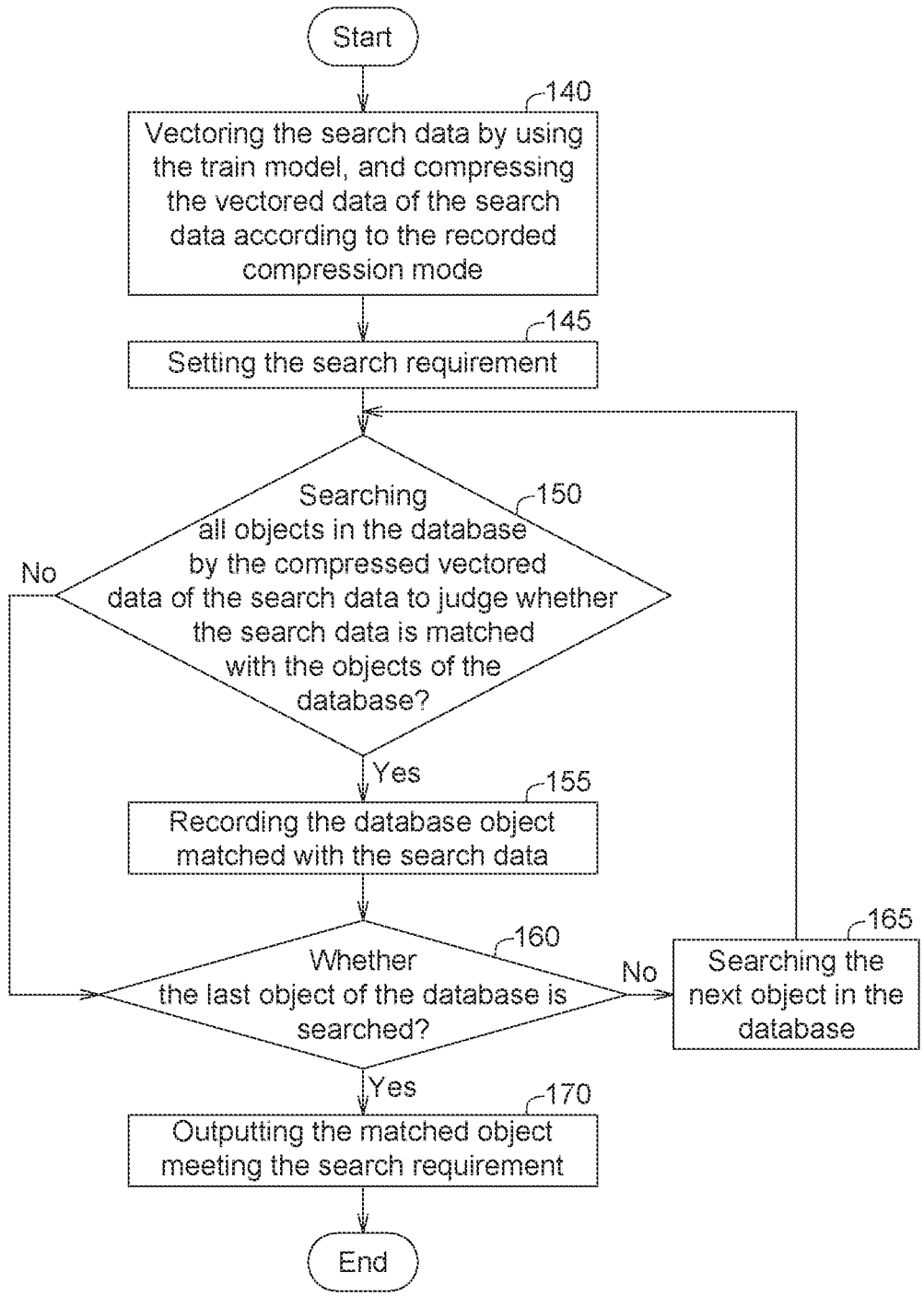
FIG. 1B shows a flow chart of a data search method according to the first embodiment of the application.

FIG. 1A shows a flow chart for configuring a vector database according to a first embodiment of the application. FIG. 1B shows a flow chart of a data search method according to the first embodiment of the application.

Refer to FIG. 1A. In the step 105, a model M is trained. In the application, details of training the model M are not specified.

In the step 110, it is judged whether data dimension is higher or equal to a dimension threshold value. For example but not limited by, the dimension threshold value is 64. In usual, when data has higher dimension, it is helpful in accuracy calculating; and when data has lower dimension, it is helpful in reducing calculating resource. Thus, selection of dimension threshold value is a tradeoff between accuracy calculating and reducing calculating resource.

In the step 115, a plurality of objects (data) of the database (also referred as the database B) are vectored into a plurality of vector values of the objects (data) by the trained model M. The database stores a plurality of objects. For example but not limited by, the trained model M vectors an object A of the database into the vector values $A=(A_1, A_2, \ldots, A_n)$ of the object A, wherein n is a positive integer, which represents the dimension. In human face recognition, voiceprint recognition and fingerprint recognition operations, the human face objects, the voiceprint objects, the fingerprint objects are vectored. In usually, when the dimension n is higher, it is helpful in accuracy calculation, and when the dimension n is lower, it is helpful in reducing the calculation resource. Thus, setting of the dimension n is a tradeoff between the above requirements.

The object A may be for example but not limited by, human face images (used in human face recognition), human voiceprint objects (used in voiceprint recognition), human fingerprint objects (used in fingerprint recognition) etc.

In the step 120, it is judged whether the resolution is equal to or smaller than a resolution threshold value. For example but not limited by, the resolution threshold value is 3 bits. When the step 120 is negative, the vector values of the objects of the database are compressed (the step 125). When the step 120 is positive, the vector values of the objects of the database are stored (the step 135). In one embodiment of the application, a better operation result is generated when the resolution is equal to or smaller than 3 bits (8 states).

In one possible example of the application, data compression in the step 125 is for example but not limited by, data-equal-quantity compression or dimension-equal-quantity compression which are described in details later.

In the step 130, the compression mode (or said the compression mode) (either the data-equal-quantity compression mode or the dimension-equal-quantity compression mode) is recorded.

Further, in one embodiment of the application, when new objects are added into the database, if the data amount of the existing objects is much larger than the data amount of the new objects, the new objects are compressed by the current compression mode. However, if the data amount of the existing objects is much smaller than the data amount of the new objects, the new objects are still compressed by the current compression mode. But if the new objects cause significant variation on data distribution of the database, which means the database contains totally different information from the original objects, then the database is re-compressed. In re-compressing the database, the data-equal-quantity compression or the dimension-equal-quantity compression is adapted but the compression point is changed.

Now refer to FIG. 1B. The search data (the comparison data, the recognition data) is used in searching the database to search database objects similar to the search data. For example but not limited by, the database is a human face image database, the human face image fetched by the camera may be used as the search data in searching the human face image database to search database objects similar to the search data.

In the step 140, the search data is vectored by using the train model M, and the vectored data of the search data is compressed according to the compression mode (data-equal-quantity compression or dimension-equal-quantity compression) recorded in the step 130. That is, in one embodiment of the application, for example but not limited by, when the resolution is 3 bits, after compression, each dimension vector of the objects of the database is compressed as or lower than 3 bits or 8 states, and each dimension vector of the search data is compressed as or lower than 3 bits or 8 states.

In the step 145, the search requirement is set (for example but not limited by, the quantity or ratio of the matched dimensions).

In the step 150, the compressed vectored data of the search data is used in searching all objects in the database to judge whether the search data is matched with the objects of the database. For example but not limited by, when the matched dimensions between the search data and the database object meet the search requirement, it judges the search data is similar or the same as the matched object of the database and vice versa.

For example but not limited by, the object data has 512 dimensions. When the matched dimensions between the search data and the database object are higher than the search requirement (for example but not limited by, 300 dimensions), it judges the search data is similar or the same as the matched object of the database.

When the step 150 is positive, the database object matched with the search data is recorded (the step 155); and when the step 150 is negative, then it is judged whether the last object of the database is searched (the step 160).

In the step 155, the recorded object information includes but not limited by, the object number, the object name, the matched values and etc.

When the step 160 is negative, the compressed vectored data of the search data searches the next object in the database (the step 165). When the step 160 is positive, the matched object meeting the search requirement is output (the step 170).

In the step 170, the matched object information to be output may be, for example but not limited by, the raw data of the object, the sorted data of the object, data of several objects having high matched degree or data of the object having highest signal strength (highest match degree).

Now details of the vector database configuration and the data search method are described. When the similarity analysis is implemented by Hamming distance, the advantage is fast calculation. Thus, Hamming distance may be used in high dimension low resolution similarity analysis. High dimension is helpful in solving accuracy problem due to low resolution, and low resolution has advantages in fast calculation, low storage data size, fast database read etc. In the following, Hamming distance is used in achieving fast and accuracy calculation, but the application is not limited by this.

Table 1 shows one example of the database. Here, the database B is a human face image database, but the application is not limited by this. The human face image database stores a plurality of human face images belonging to different persons, wherein each person has several human face images. Besides, there are 512 dimensions, but the application is not limited by this.

TABLE 1

| Code | Ba1 | Ba2 | ... | Bb1 | Bb2 | ... |
|---|---|---|---|---|---|---|
| person | a | a | ... | b | b | ... |
| image | 1 | 2 | ... | 1 | 2 | ... |
| D1 (vector 1) | $Ba1_1$ | $Ba2_1$ | ... | $Bb1_1$ | $Bb2_1$ | ... |
| D2 (vector 2) | $Ba1_2$ | $Ba2_2$ | ... | $Bb1_2$ | $Bb2_2$ | ... |
| D3 (vector 3) | $Ba1_3$ | $Ba2_3$ | ... | $Bb1_3$ | $Bb2_3$ | ... |
| ... | ... | ... | ... | ... | ... | ... |
| D510 (vector 510) | $Ba1_{510}$ | $Ba2_{510}$ | ... | $Bb1_{510}$ | $Bb2_{510}$ | ... |
| D511 (vector 511) | $Ba1_{511}$ | $Ba2_{511}$ | ... | $Bb1_{511}$ | $Bb2_{511}$ | ... |
| D512 (vector 512) | $Ba1_{512}$ | $Ba2_{512}$ | ... | $Bb1_{512}$ | $Bb2_{512}$ | ... |

In the table 1, "a" and "b" refer to different persons and "1" and "2" refer to different images. Thus, "Ba1" refers to the first image of the person "a", "Ba2" refers to the second image of the person "a", "Bb2" refers to the second image of the person "b", and others are so on.

The trained AI model vectors "Ba1" (the first image of the person "a") into the vectors: $(Ba1_1, Ba1_2, Ba1_3, \ldots, Ba1_{510}, Ba1_{511}, Ba1_{512})$. The vector "$Ba1_1$" refers to the first dimension vector of "Ba1" (the first image of the person "a") and others are so on.

Table 2 shows one example of table 1.

TABLE 2

| Code | Ba1 | Ba2 | ... | Bb1 | Bb2 | ... |
|---|---|---|---|---|---|---|
| person | a | a | ... | b | b | ... |
| image | 1 | 2 | ... | 1 | 2 | ... |
| D1 (vector 1) | 0.12 | 0.03 | ... | 0.04 | 0.10 | ... |
| D2 (vector 2) | −0.06 | −0.16 | ... | −0.15 | −0.08 | ... |
| D3 (vector 3) | 0.03 | 0.12 | ... | 0.11 | −0.07 | ... |
| ... | ... | ... | ... | ... | ... | ... |
| D510 (vector 510) | 0.05 | 0.14 | ... | 0.09 | 0.05 | ... |
| D511 (vector 511) | 0.09 | 0.16 | ... | 0.15 | −0.03 | ... |
| D512 (vector 512) | −0.06 | 0.01 | ... | 0.07 | 0.14 | ... |

In table 2, the vectors are normalized. After normalization, the vectors are between +0.16 and −0.16, but the application is not limited by this.

Figure 2:
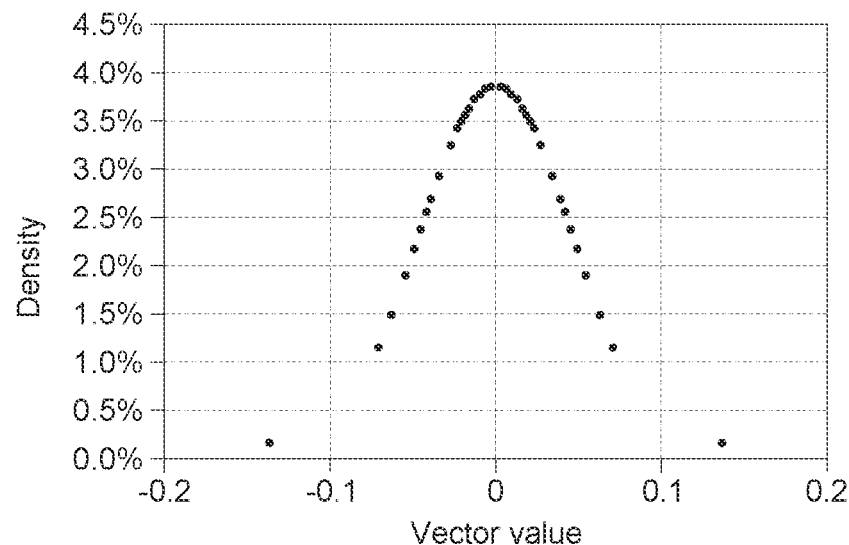
FIG. 2 shows one example of vector value analysis of the database according to the first embodiment of the application.

FIG. 2 shows one example of vector value analysis of the database according to the first embodiment of the application. The application is not limited by this. In FIG. 2, the horizontal axis refers to the vector value and the vertical axis refers to the density of the vector values in the database. It is assumed that the database has 19955 images belonging to different persons, and each person has several images. The model vectors each image into 512 (n) values, i.e. data has 512 dimensions. Thus, data vector has 32 states. For example, the density of the vector value 0.05 is 1.9%, which means the vector value of 0.05 occupies 1.9% of the whole data.

Data search in the first embodiment of the application is described. Human face recognition is as an example which is not to limit the application. In the human face database, after model vectorization, the first human face image Ba1 of the person a is represented as: $(Ba1_1, Ba1_2, Ba1_3, \ldots, Ba1_{510}, Ba1_{511}, Ba1_{512})$. The human face image of the person x is fetched by the camera. After model vectorization, the human face image Bx of the person x is represented as: $(Bx1_1, Bx1_2, Bx1_3, \ldots, Bx1_{510}, Bx1_{511}, Bx1_{512})$. In the step 150, the vectors $(Bx1_1, Bx1_2, Bx1_3, \ldots, Bx1_{510}, Bx1_{511}, Bx1_{512})$ of the search data is used for searching or comparing the vectors $(Ba1_1, Ba1_2, Ba1_3, \ldots Ba1_{510}, Ba1_{511}, Ba1_{512})$ of the first human face image Ba1 of the person a. When $Bx1_1$ is matched with $Ba1_1$, the first dimension is matched; and when $Bx1_1$ is not matched with $Ba1_1$, the first dimension is not matched. After all dimensions are compared, the matched dimension quantity is found. When the match dimensions between the vectors of the human face image Bx of the person x and the first human face image Ba1 of the person a are higher than the search requirement (for example but not limited by, 300 dimension), then the person x is matched the person a, that is, after human face recognition, the person x and the person a are the same person and vice versa.

Details of vector compression (data digitalization) of the first embodiment of the application are described. In the first embodiment of the application, reducing the resolution is helpful in Hamming distance calculation and thus, data is compressed to lower the resolution.

In here, the resolution is one bit while "0" is as the compression point. When Bn (the vector value) is smaller than or equal to 0, Bn is compressed as 0; and when Bn (the vector value) is larger than 0, Bn is compressed as 1.

Alternatively, in other possible example, the resolution is one bit while the middle value "middle(Bn)" is as the compression point, wherein the middle value "middle(Bn)" is the middle value of all vector values. When Bn (the vector value) is smaller than or equal to "middle(Bn)", Bn is compressed as 0; and when Bn (the vector value) is larger than "middle(Bn)", Bn is compressed as 1.

Alternatively, in other possible example, the resolution is one bit while the average value "avg(Bn)" is as the compression point, wherein the average value "avg(Bn)" is the average value of all vector values. When Bn (the vector value) is smaller than or equal to "avg(Bn)", Bn is compressed as 0; and when Bn (the vector value) is larger than "avg(Bn)", Bn is compressed as 1.

Figure 3:
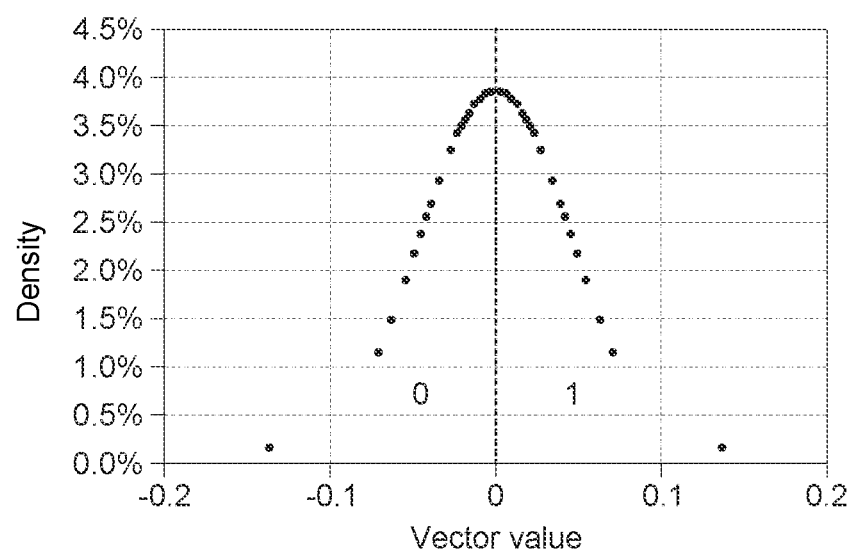
FIG. 3 shows vector compression according to the first embodiment of the application.

FIG. 3 shows vector compression according to the first embodiment of the application. In FIG. 3, the case that the resolution is one bit while "0" is as the compression point is as an example, which is not to limit the application.

After compression, if the vector value of the database is unevenly distributed due to some reasons, then taking the middle value "middle(Bn)" as the compression point may achieve better compression effects. In the application, data partition and data compression have the same or similar meaning.

Figure 4A:
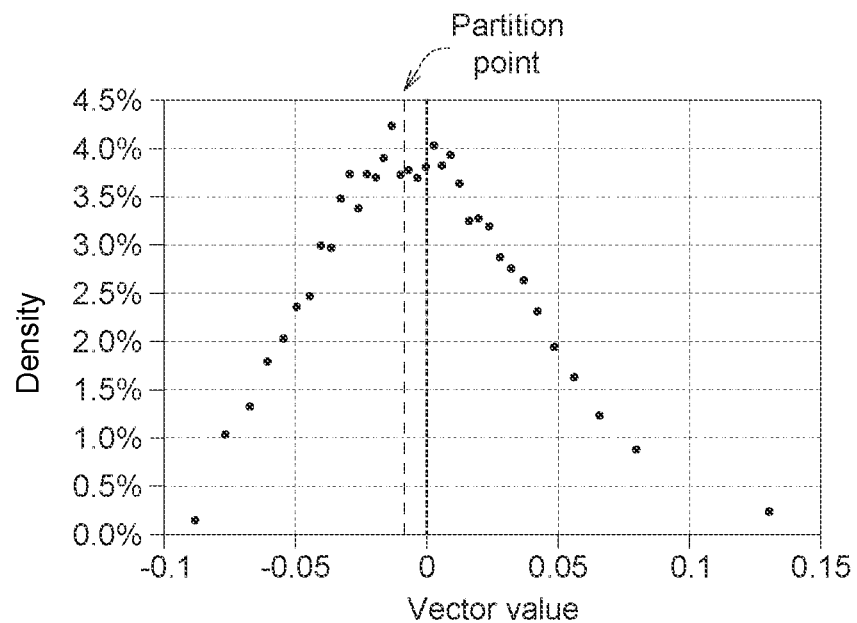
FIG. 4A and FIG. 4B show vector compression according to the first embodiment of the application, wherein data partition is based on the dimensions.
Figure 4B:
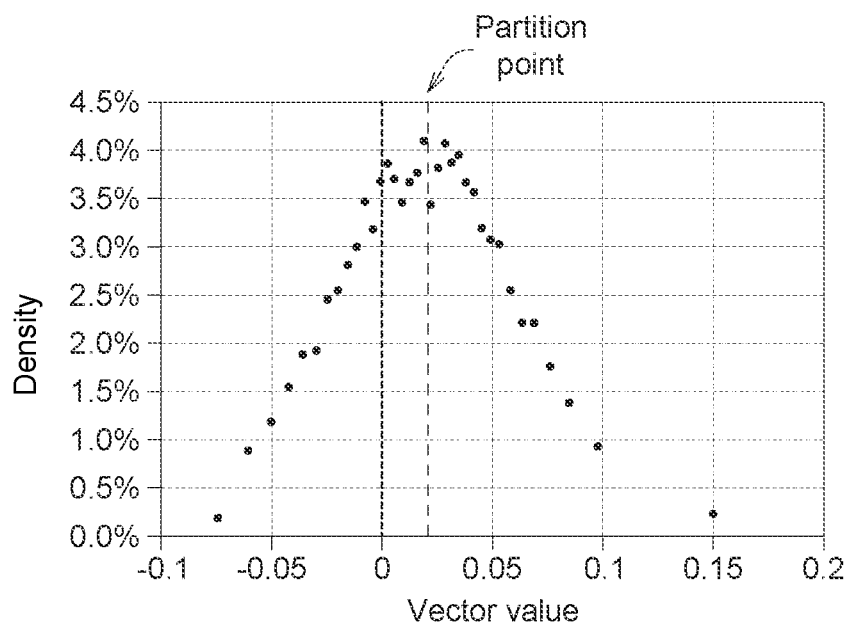

FIG. 4A and FIG. 4B show vector compression according to the first embodiment of the application, wherein data partition is based on the dimensions. FIG. 4A shows data distribution at the 15th dimension (D15) (the total dimension is 512); and FIG. 4B shows data distribution at the 109th dimension (D109) (the total dimension is 512). As shown in FIG. 4A and FIG. 4B, data compression results are totally different in taking "0" and the middle value "middle(Bn)" as the compression point, respectively.

Figure 5:
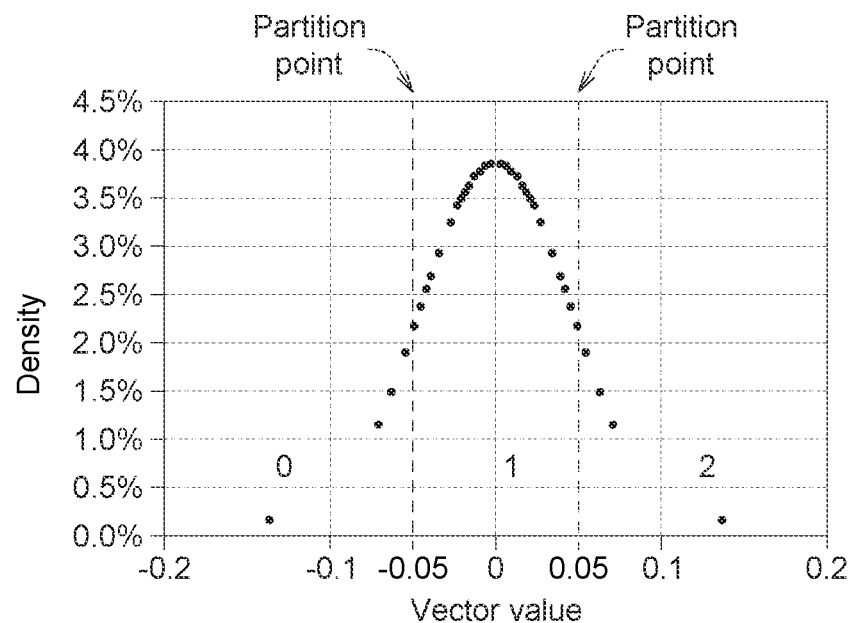
FIG. 5 shows data compression result of dimension-equal-quantity compression according to the first embodiment of the application.

FIG. 5 shows data compression result of dimension-equal-quantity compression according to the first embodiment of the application. As shown in FIG. 5, data may be compressed by dimension-equal-quantity into m parts (m may be 2, 3, 4, 5 . . . or any positive integer). When m=2, the compression result is 2 states, i.e. 0 or 1, and the resolution is one bit. When m=3, the compression result is 3 states, i.e. 0 or 1 or 2. When m=4, the compression result is 4 states, i.e. 0 or 1 or 2 or 3, and the resolution is two bits. Others are so on. FIG. 5 shows data compression on the data vectors by dimension-equal-quantity compression into three states (0 or 1 or 2) and the partition points are −0.05 and +0.05. That is, when the vector is smaller than −0.05, the vector is compressed as 0; when the vector is between −0.05 and +0.05, the vector is compressed as 1; and when the vector is larger than +0.05, the vector is compressed as 2.

Figure 6:
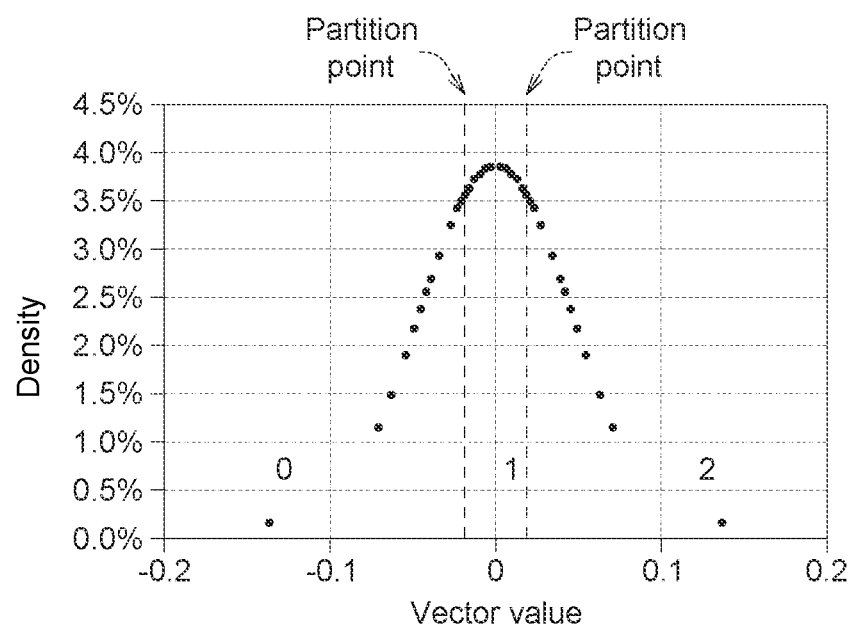
FIG. 6 shows data compression result of the data-equal-quantity compression according to the first embodiment of the application.

FIG. 6 shows data compression result of the data-equal-quantity compression according to the first embodiment of the application. As shown in FIG. 6, data may be compressed by data-equal-quantity into m parts (m may be 2, 3, 4, or any positive integer). FIG. 6 shows the data vectors are compressed into 3 states (0 or 1 or 2) by data-equal-quantity compression. After data-equal-quantity compression, about one-third of the data vectors are compressed as 0, about one-third of the data vectors are compressed as 1, and about one-third of the data vectors are compressed as 2. The partition points are decided based on data distribution. As shown in FIG. 6, data distribution is much even.

From the above description, in the first embodiment of the application, by using the data-equal-quantity compression, data distribution is much even. In the first embodiment of the application, the dimension implementation uses the Hamming distance calculation, which is suitable in low resolution database. Usually, the dimension implementation has better results under three-bit resolution (8 states or fewer states). In the first embodiment of the application, the system storage capacity requirement is not high and calculation is fast.

Further, in the first embodiment of the application, data partition (i.e. data compression) is helpful in lowering the resolution. As described above, data partition may be data-equal-quantity compression, dimension-equal-quantity compression or other partition (for example but not limited by, exponential distance partition). In data partition, the data vectors may be partitioned into m states, wherein m may be smaller than or equal to 8 (three-bit resolution).

In the first embodiment of the application, data-equal-quantity compression may have large application, stability and better effects.

Second Embodiment

Figure 7A:
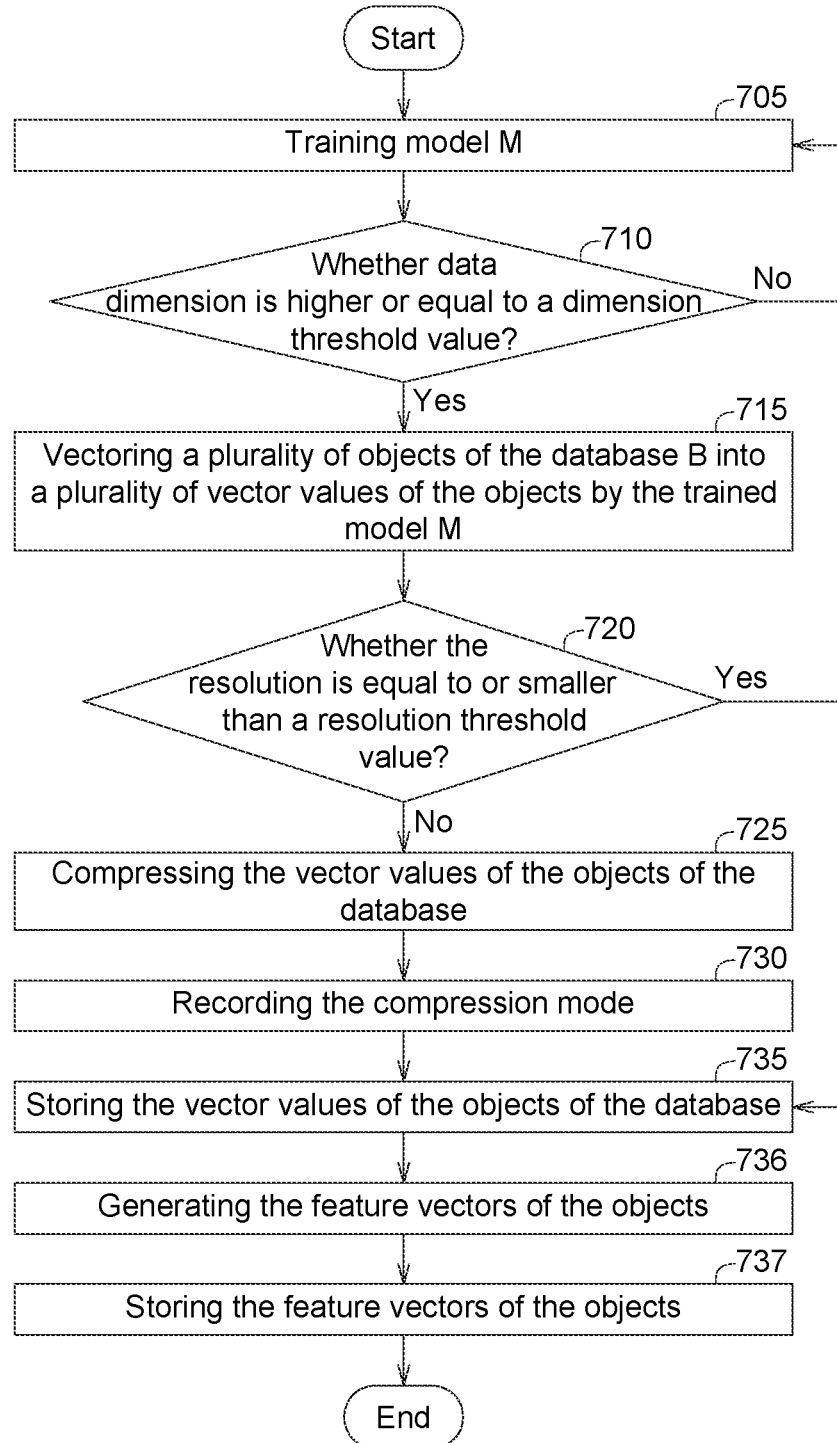
FIG. 7A shows a flow chart for vector database configuration according to a second embodiment of the application.
Figure 7B:
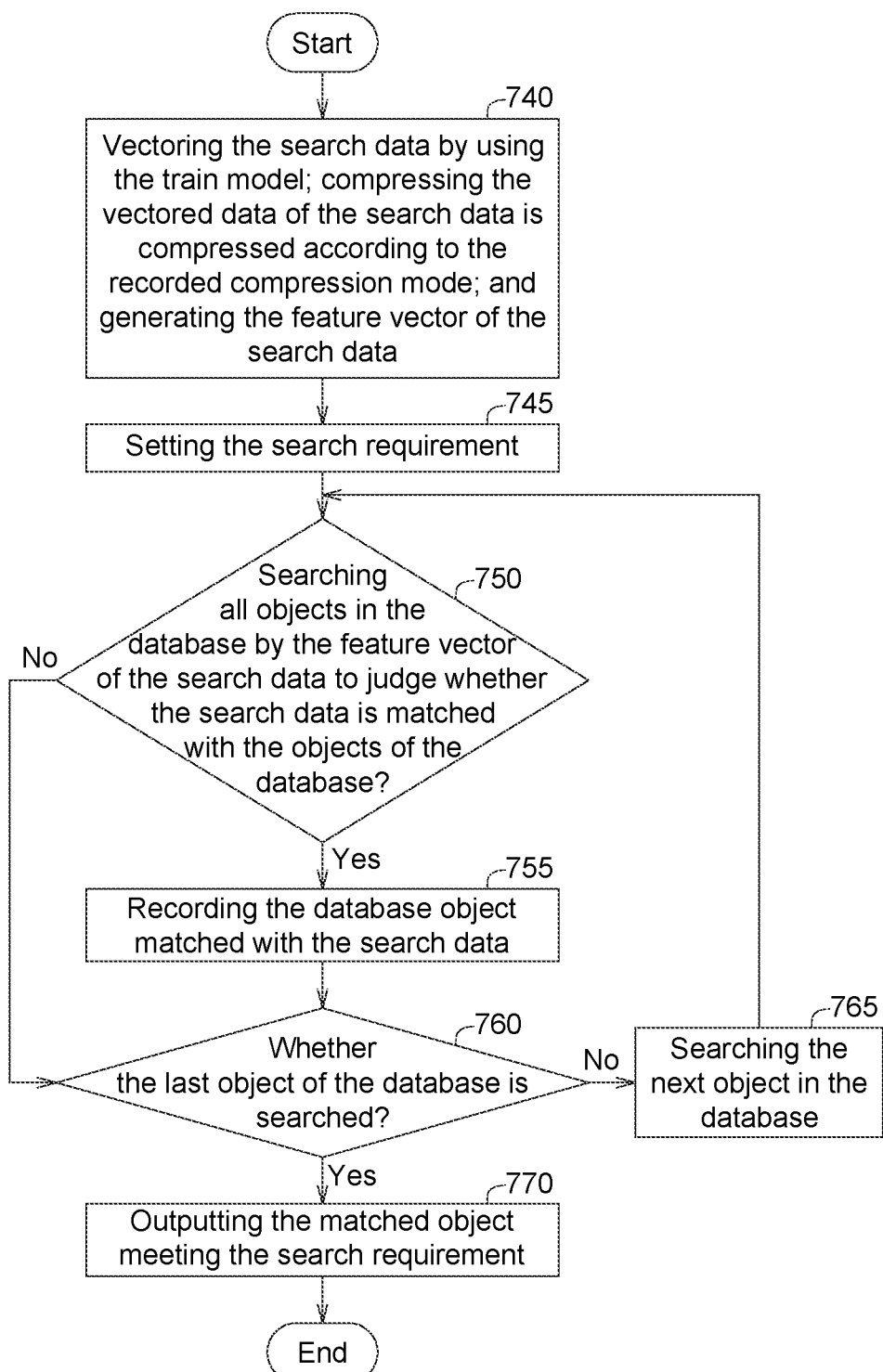
FIG. 7B shows a flow chart for data search according to the second embodiment of the application.

FIG. 7A shows a flow chart for vector database configuration according to a second embodiment of the application. FIG. 7B shows a flow chart for data search according to the second embodiment of the application.

Steps 705-735 in FIG. 7A are the same as or similar with the steps 105-135 in FIG. 1A and details thereof are omitted here.

In the step 736, respective feature vectors (or called representative vectors) of each of the objects are generated. Details are as follows.

In the second embodiment of the application, in dimension implementation, the human face image database is as an example, but the application is not limited by this. In the human face image database, each person has a lot of face images. The trained model vectors each face images of the same person to generate multi-dimension vectors. The feature vectors of the person is generated based on most-common value "MODE" in each dimension on the multi-dimension vectors of the face images of the person.

For example, in the database B, the feature vectors of the person "a" may be represented as: $(Ba_1, Ba_2, \ldots Ba_n)$, wherein $Ba_i = MODE(Ba1_i, Ba2_i, Ba3_i \ldots)$, $i=1{\sim}n$. The function or the parameter "MODE" refers to the most-common value among the values. In the same dimension, when there are more than one values having most common, any one of the most common values may be used as the feature vector, or in other embodiment, the smallest among the most common values may be used as the feature vector. The feature vectors of the search data are generated in the same or the similar way.

For easy understanding, table 3 shows an example for generation of the feature vectors, which is not to limit the application.

TABLE 3

| Code | Ba1 | Ba2 | Ba3 | Ba4 | Ba5 | Mode(Ba) |
| --- | --- | --- | --- | --- | --- | --- |
| person | a | a | a | a | a | N/A |
| image | 1 | 2 | 3 | 4 | 5 | N/A |
| D1 (vector 1) | 0 | 0 | 0 | 1 | 0 | 0 |
| D2 (vector 2) | 2 | 2 | 2 | 3 | 2 | 2 |
| D3 (vector 3) | 1 | 2 | 3 | 2 | 3 | 2 or 3 |
| ... | ... | ... | ... | ... | ... | ... |
| D510 (vector 510) | 2 | 3 | 1 | 1 | 1 | 1 |
| D511 (vector 511) | 3 | 0 | 2 | 1 | 2 | 2 |
| D512 (vector 512) | 0 | 3 | 3 | 3 | 3 | 3 |

In the table 3, after model vectorization, the first image of the person "a" has a vector: $(0, 2, 1, \ldots, 2, 3, 0)$ and others are so on.

The first dimension D1 of the five images of the person "a" are 0, 0, 0, 1 and 0, respectively, wherein the value "0" has most counts (i.e. most common). Thus, the first element (the first dimension) $Ba_1$ of the feature vector of the person "a" is 0. Similarly, the second element $Ba_2$ (the second dimension) of the feature vector of the person "a" is 2; the third element Baa (the third dimension) of the feature vector of the person "a" is 2 or 3; the $510^{th}$ element $Ba_{510}$ (the $510^{th}$ dimension) of the feature vector of the person "a" is 1; the 511th element $Ba_{511}$ (the $511^{th}$ dimension) of the feature vector of the person "a" is 2; and the $512^{th}$ element $Ba_{512}$ (the $512^{th}$ dimension) of the feature vector of the person "a" is 3.

Thus, the feature vector of the person "a" (the object "a") is $(Ba_1, Ba_2, \ldots Ba_n) = (0, 2, (2 \text{ or } 3), \ldots, 1, 2, 3)$.

In the step 737, the respective feature vectors of all the objects found in the step 736 are stored and the database is named as database "BM", to distinguish from the original database B.

Steps 740-770 of FIG. 7B are the same or similar with the steps 140-170 of FIG. 1B, and thus the details are omitted here. However, in the step 740, the search data is vectored by using the train model M; the vectored data of the search data is compressed according to the compression mode; and the feature vector of the search data is generated in the similar way. In the following steps, the feature vector of the search data is used to search the database "BM".

Data search of the second embodiment of the application is described. Human face recognition is as an example which is not to limit the application. In the human face database, after model vectorization and generation of the feature vector, the feature vector of the person a is represented as: $(Ba_1, Ba_2, \ldots Ba_n)$. The human face image of the person x is fetched by the camera. After model vectorization, feature vector of the person x is represented as: $(Bx_1, Bx_2, \ldots Bx_n)$. In the step 750, the feature vector $(Bx_1, Bx_2, \ldots Bx_n)$ of the person "x" is used for searching or comparing the feature vector $(Ba_1, Ba_2, \ldots Ba_n)$ of the person a. When $Bx_1$ is matched with $Ba_1$, the first dimension is matched; and when $Bx_1$ is not matched with $Ba_1$, the first dimension is not matched. After all dimensions are compared, the matched dimension quantity is found. When the match dimensions between the feature vector of the person x and the feature vector of the person a are higher than the search requirement (for example but not limited by, 300 dimension), then the person x is matched the person a, that is, after human face recognition, the person x and the person a are the same person and vice versa.

In one embodiment of the application, each dimension of the feature vector of the search data has several vector states and the number of the vector states is equal to or lower than 3 bits or 8 bits. Also, each dimension of the feature vector of the objects of the database has several vector states and the number of the vector states is equal to or lower than 3 bits or 8 bits.

Third Embodiment

Figure 8A:
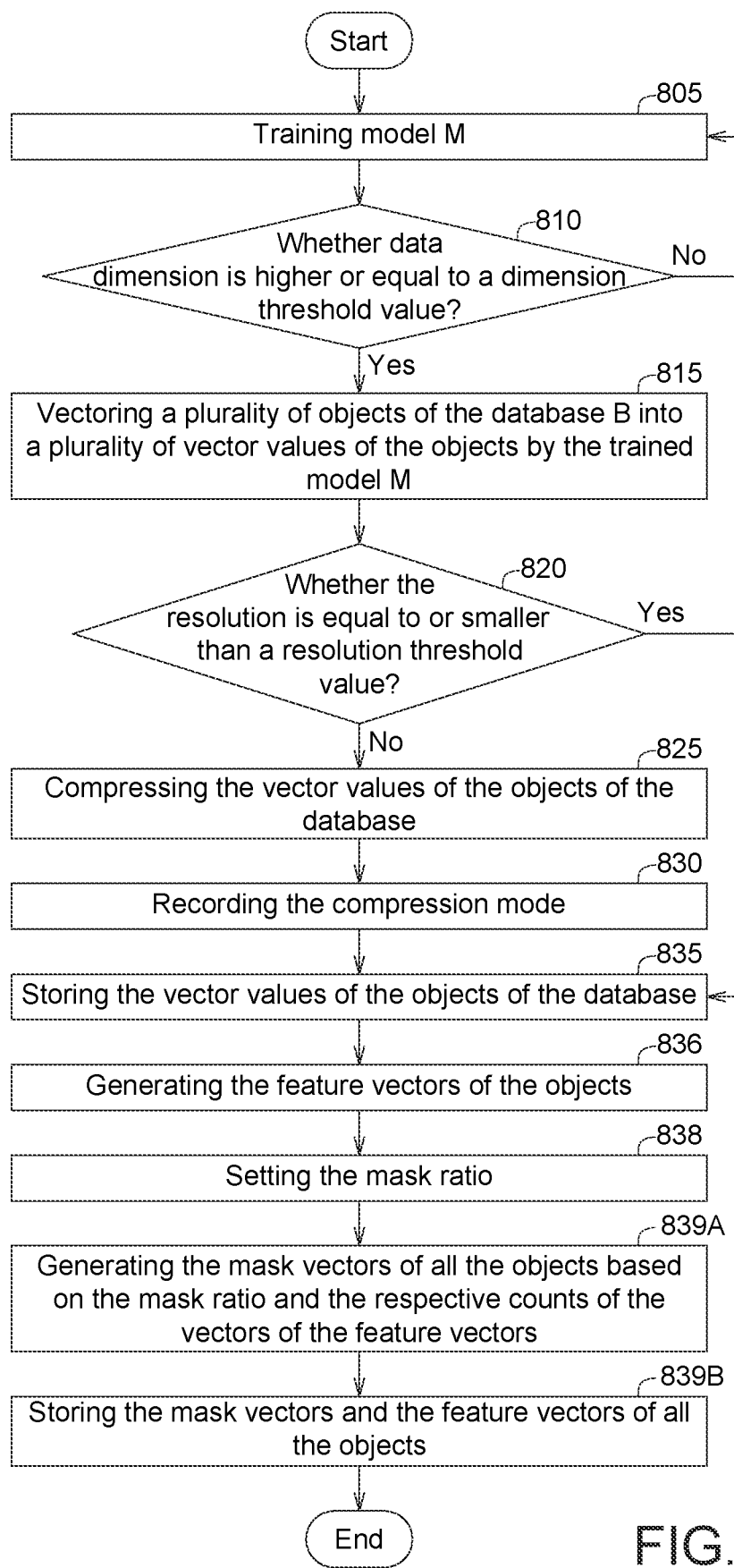
FIG. 8A shows a flow chart for vector database configuration according to a third embodiment of the application.
Figure 8B:
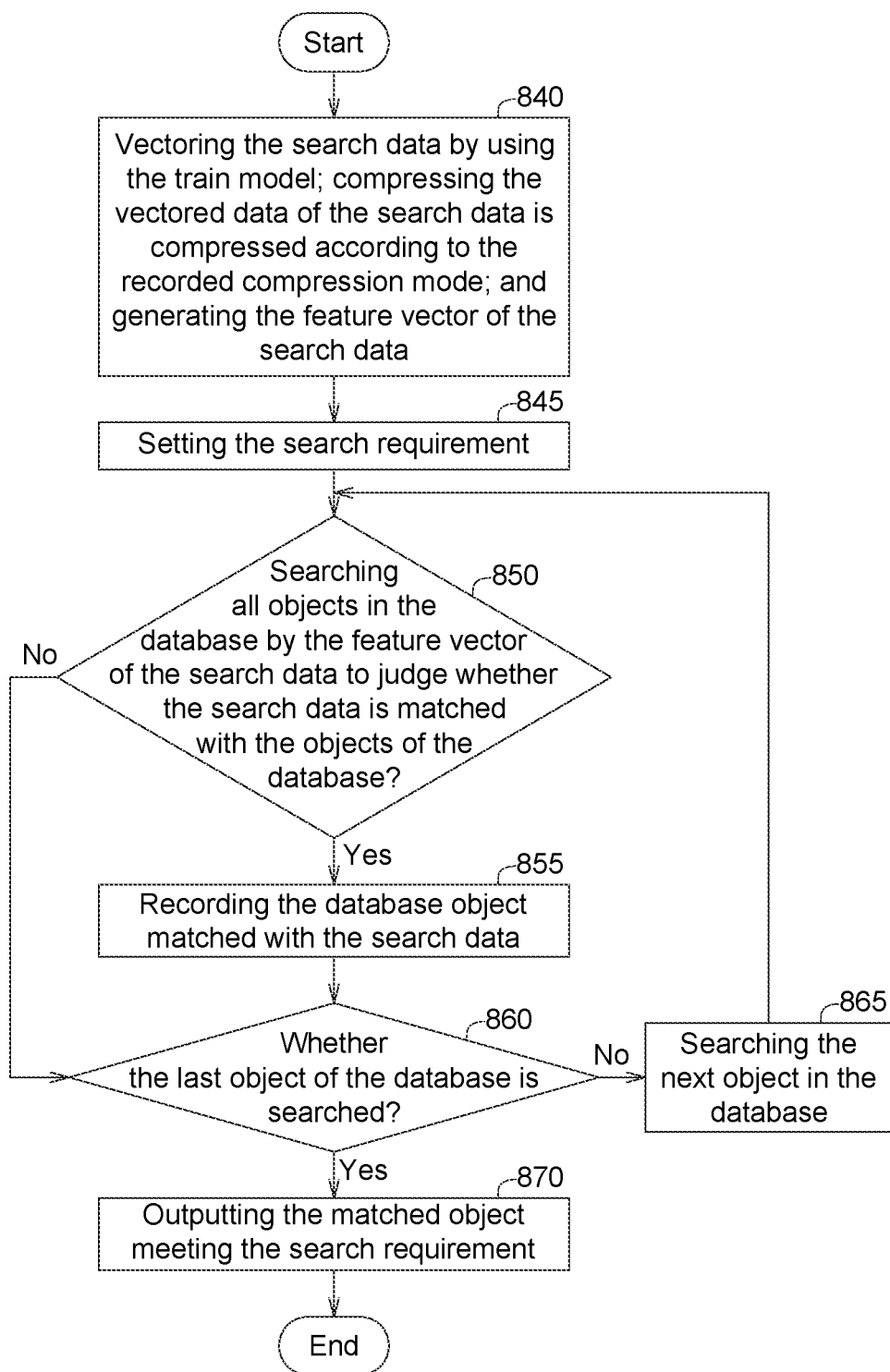
FIG. 8B shows a flow chart for data search according to the third embodiment of the application.

FIG. 8A shows a flow chart for vector database configuration according to a third embodiment of the application. FIG. 8B shows a flow chart for data search according to the third embodiment of the application.

Steps 805-836 in FIG. 8A are the same as or similar with the steps 705-736 in FIG. 7A and details thereof are omitted here.

In the step 838, a mask ratio is set. The third embodiment of the application masks the elements of the feature vector based on the mask ratio for improving match confidence.

Details of the step 838 are as follows.

In the example, the database has 19 data of the object a (for example, 19 human face images of the person a). After vectorization, the 19 dimension vectors of the object a are as the table 4.

TABLE 4

|  | D1 | D2 | D3 | D4 | D5 | D6 | D7 | D7 | D9 | D10 |
|---|---|---|---|---|---|---|---|---|---|---|
| Ba1 | 1 | 1 | 1 | 0 | 1 | 0 | 1 | 1 | 1 | 1 |
| Ba2 | 0 | 0 | 1 | 0 | 1 | 0 | 0 | 0 | 0 | 0 |
| Ba3 | 1 | 0 | 1 | 1 | 1 | 1 | 1 | 0 | 1 | 0 |
| Ba4 | 1 | 0 | 1 | 0 | 1 | 0 | 1 | 0 | 1 | 0 |
| Ba5 | 0 | 0 | 1 | 0 | 1 | 0 | 0 | 0 | 1 | 0 |
| Ba6 | 0 | 0 | 1 | 0 | 1 | 0 | 0 | 0 | 1 | 0 |
| Ba7 | 1 | 0 | 1 | 1 | 1 | 1 | 1 | 1 | 1 | 0 |
| Ba8 | 1 | 0 | 1 | 1 | 1 | 1 | 0 | 0 | 1 | 0 |
| Ba9 | 1 | 0 | 1 | 1 | 1 | 0 | 1 | 0 | 1 | 0 |
| Ba10 | 1 | 0 | 1 | 1 | 1 | 0 | 1 | 1 | 1 | 0 |
| Ba11 | 0 | 0 | 0 | 0 | 0 | 0 | 0 | 0 | 0 | 0 |
| Ba12 | 0 | 0 | 1 | 0 | 0 | 0 | 0 | 0 | 0 | 0 |
| Ba13 | 1 | 0 | 1 | 1 | 1 | 0 | 1 | 1 | 1 | 0 |
| Ba14 | 1 | 0 | 1 | 1 | 1 | 0 | 1 | 1 | 1 | 0 |
| Ba15 | 1 | 1 | 1 | 1 | 1 | 0 | 1 | 1 | 1 | 0 |
| Ba16 | 1 | 0 | 1 | 1 | 1 | 0 | 1 | 1 | 1 | 0 |
| Ba17 | 0 | 0 | 1 | 0 | 0 | 0 | 0 | 0 | 0 | 0 |
| Ba18 | 0 | 0 | 1 | 0 | 0 | 0 | 0 | 0 | 0 | 0 |
| Ba19 | 1 | 0 | 1 | 1 | 1 | 1 | 1 | 1 | 1 | 0 |
| Ba | 1 | 0 | 1 | 1 | 1 | 0 | 1 | 0 | 1 | 0 |
| counts | 12 | 17 | 18 | 10 | 15 | 15 | 11 | 11 | 14 | 18 |
| mask | 0 | 1 | 1 | 0 | 1 | 1 | 0 | 0 | 1 | 1 |

In the third embodiment of the application, the feature vector of the person a is (1, 0, 1, 1, 1, 0, 1, 0, 1, 0). The respective counts of the ten elements of the feature vector are 12, 17, 18, 10, 15, 15, 11, 11, 14 and 18, respectively. That is, the first element Ba1 (the first dimension) of the feature vector of the person a is the value "1", which has counts of 12. Others are so on.

When the mask ratio is 40%, it means that 40% of the elements of the feature vector are masked. In the table 4, the feature vector includes 10 elements (ten dimensions), 10*40%=4. That is, among the feature vector, the four elements having low counts are to be masked. In the table 4, the four elements having low counts are D1 (having counts of 12), D4 (having counts of 10), D7 (having counts of 11) and D8 (having counts of 11). Thus, the mask bits of the dimensions D1, D4, D7 and D8 are set as 0 while the mask bits of the other dimensions are set as 1. The mask vector of the object a is: (0, 1, 1, 0, 1, 1, 0, 0, 1, 1). If the vector is masked, then the masked vector is not used in the dimension match.

That is, in the third embodiment of the application, the vectors having low counts and low confidence are masked.

In the step 839A, the mask vectors of all the objects are generated based on the mask ratio and the respective counts of the vectors of the feature vectors.

In the step 839B, the mask vectors and the feature vectors of all the objects are stored in the database BMM, which is distinguished from the database BM.

Steps 840-870 of FIG. 8B are the same or similar with the steps 740-770 of FIG. 7B and thus the details are omitted here. However, in the step 840, the search data is vectored by using the train model M; the vectored data of the search data is compressed according to the compression mode; and the feature vector of the search data is generated in the similar way. In the following steps, the feature vector of the search data is used to search the database "BMM".

Data search of the third embodiment of the application is described. Human face recognition is as an example which is not to limit the application. In the human face database, after model vectorization and generation of the feature vector and the mask vector, the feature vector of the person a is represented as: $(Ba_1, Ba_2, \ldots Ba_n)$ and the mask vector of the person a is represented as: $(Ba_{1M}, Ba_{2M}, \ldots Ba_{nM})$. The human face image of the person x is fetched by the camera. After model vectorization, the feature vector of the person x is represented as: $(Bx_1, Bx_2, \ldots Bx_n)$. In the step 850, the feature vector $(Bx_1, Bx_2, \ldots Bx_n)$ of the person "x" is used for searching or comparing the feature vector $(Ba_1, Ba_2, \ldots Ba_n)$ of the person a with consideration of the mask vector of the person a. When $Bx_1$ is matched with $Ba_1$ and the vector $Ba_1$ is not masked, the first dimension is matched; when $Bx_1$ is not matched with $Ba_1$ (no matter the vector $Ba_1$ is masked or not), the first dimension is not matched; and when the vector $Ba_1$ is masked (no matter $Bx_1$ is matched with $Ba_1$ or not), the first dimension is not matched. After all dimensions are compared, the matched dimension quantity is found. When the match dimensions between the feature vector of the person x and the feature vector of the person a are higher than the search requirement (for example but not limited by, 300 dimension), then the person x is matched the person a, that is, after human face recognition, the person x and the person a are the same person and vice versa.

In the third embodiment of the application, via masking vectors having low confidence, the confidence is improved, the search speed is fast and the storage capacity requirement is reduced.

Fourth Embodiment

In the fourth embodiment of the application, the memory device implements the data search method of the above embodiments. Details are as below.

In the fourth embodiment of the application, the vector data and the feature vector are stored in the memory cells of the memory device.

Figure 9A:
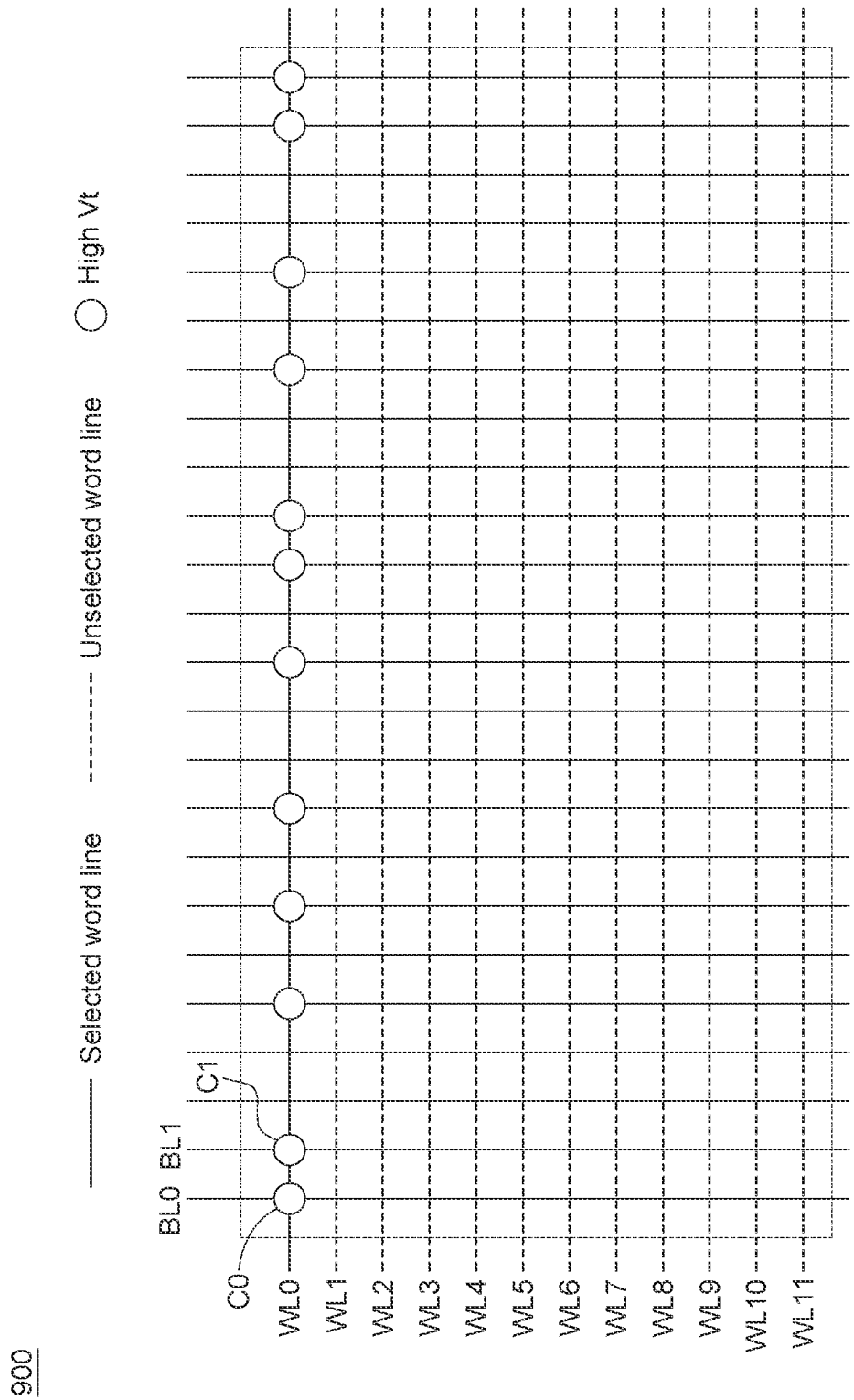
FIG. 9A shows implementing the data search method in the memory device according the fourth embodiment of the application.
Figure 9B:
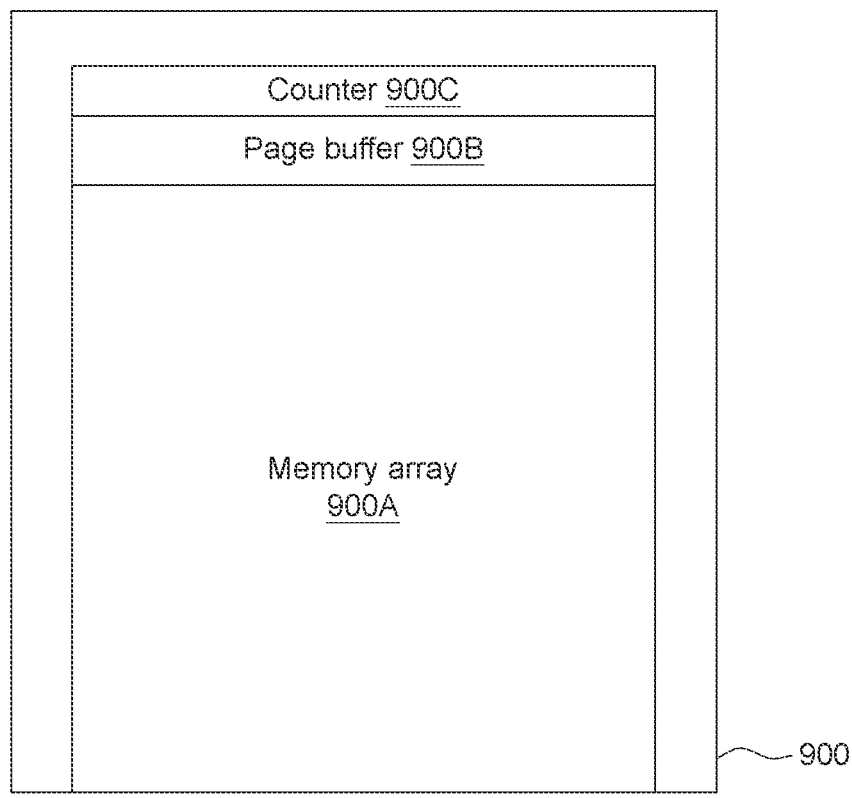
FIG. 9B shows the memory device according the fourth embodiment of the application.

FIG. 9A shows implementing the data search method in the memory device according the fourth embodiment of the application. FIG. 9B shows the memory device according the fourth embodiment of the application.

As shown in FIG. 9A and FIG. 9B, there are 512 dimensions as an example, but the application is not limited by. The feature vector of the person a has 512 dimensions and thus, the feature vector of the person a is stored in the first 512 memory cells (C0, C1, . . . ) along the word line WL0. Then, the feature vector of another person b has 512 dimensions and thus, the feature vector of the person b is stored in the next 512 memory cells along the word line WL0. Others are so on.

For example, when the feature vector of the person is logic 0, then the corresponding memory cell is programmed as the high threshold voltage (Vt); and when the feature vector of the person is logic 1, then the corresponding memory cell is programmed as the low threshold voltage.

In FIG. 9A, the memory device 900 includes a plurality of blocks, each block including a plurality of word lines (WL0, . . . ) and a plurality of bit lines (BL0, . . . ). When each word line has 128 k memory cells, each word line may store 128 k/512=256 persons' feature vectors. When each block has 128 word lines, the block stores 32 k persons' feature vectors. The memory cells are on the intersections of the word lines and the bit lines.

As shown in FIG. 9B, the memory device 900 includes a memory array 900A, a page buffer 900B and a counter 900C. The counter 900C is coupled to the memory array 900A and the page buffer 900B. The page buffer 900B is coupled to the bit lines of the memory array 900A. For example but not limited by, the counter 900C is coupled to the bit lines of the memory array 900A, for counting the logic operations results returned from the bit lines. The page buffer 900B includes a plurality of operation units for executing logic operations.

The memory device 900 stores a plurality of vectors. Now, search and recognition in the fourth embodiment of the application are described.

For example, in searching the objects stored in the memory device 900 by an object (person) x fetched by the camera, the vectors (or the feature vector) of the person x are input into the memory device 900 via the bit lines. Then, in comparing the object (person) a stored in the memory device 900 with the object (person) x, it performs logic operations on the vectors (or the feature vector) of the person x with the vectors (or the feature vector) of the person a. The logic operations are for example but not limited by, XNOR logic operations. In here, there are 512 dimensions, which is not to limit the application. The vectors (or the feature vector) of the person a are stored in 512 memory cells. The logic operation results are sent to the counter 900C via 512 bit lines. That is, the counter 900C counts the XNOR logic operation results of the vectors (or the feature vector) of the person x with the vectors (or the feature vector) of the person a. The memory device 900 outputs the number of the person (object) whose counts exceeding a threshold value, which means the person matches with the person x. In other possible embodiment, the memory device 900 outputs the respective operation results of all the stored persons (objects) to an external device and the external device finds out the matched person (object).

Figure 10:
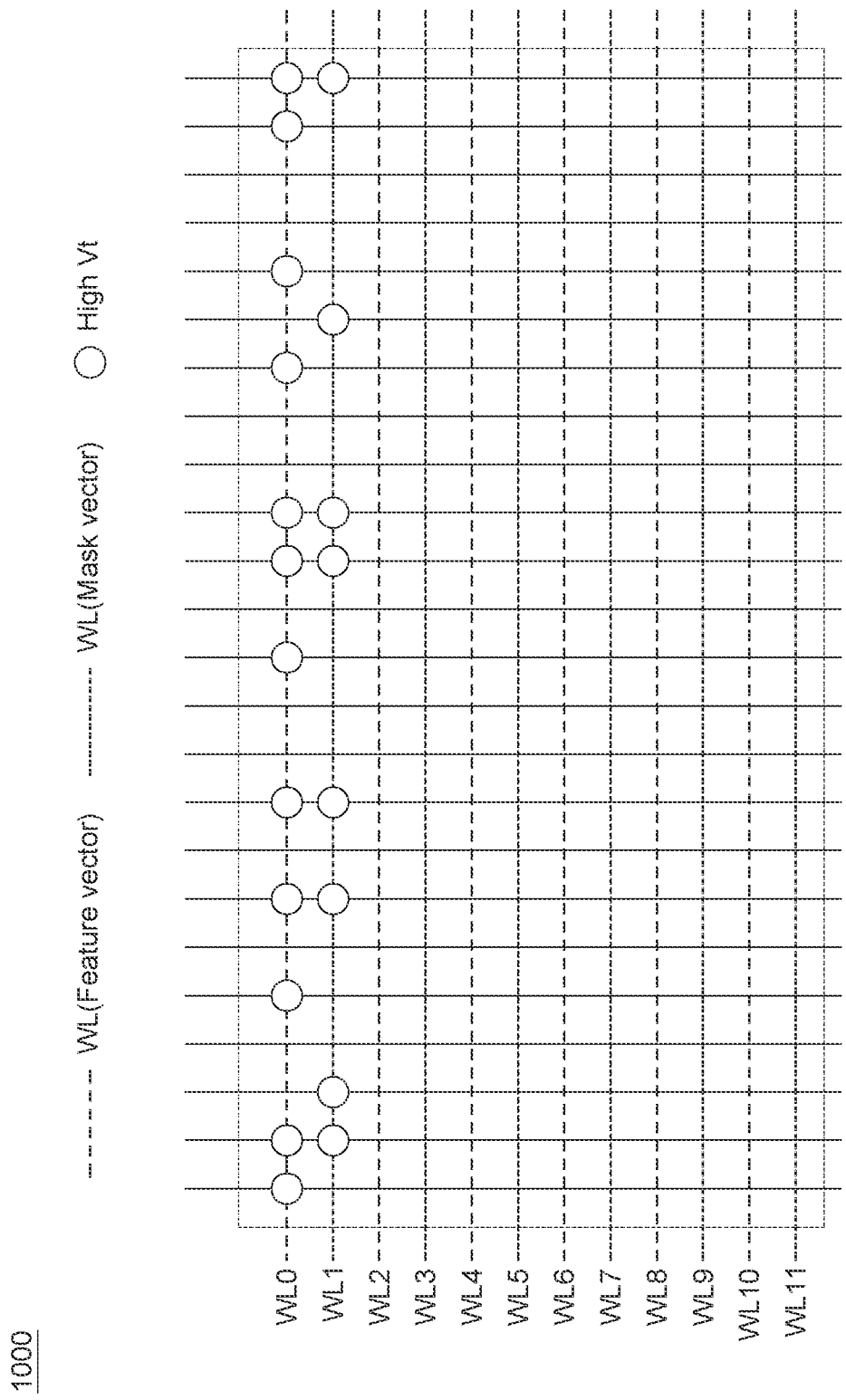
FIG. 10 shows another diagram of the memory device implementing the data search method according to the fourth embodiment of the application.

FIG. 10 shows another diagram of the memory device implementing the data search method according to the fourth embodiment of the application.

Different from FIG. 9A, in FIG. 10, the first word line group (for example but not limited by, the even word lines WL0, WL2 . . . ) may store the vectors (or the feature vectors) (also called B1) of the objects and the second word line group (for example but not limited by, the odd word lines WL1, WL3 . . . ) may store the mask vectors (also called B2) of the objects.

For example, in comparing or recognizing the persons (the objects) stored in the memory device 1000 with the person x fetched by the camera, the vectors (or the feature vectors) of the person x are input into the memory device 1000 via the bit lines. Then, in comparing the object (person) a stored in the memory device 1000 with the object (person) x, it performs logic operations on the vectors (or the feature vector) of the person x with the vectors (or the feature vector) B1 and the mask vectors B2 of the person a. The logic operations are for example but not limited by, XNOR logic operations "(B1 XNOR X) AND B2".

In here, there are 512 dimensions, which is not to limit the application. The vectors (or the feature vector) of the person a are stored in 512 memory cells. The logic operation results are sent to the counter via 512 bit lines. That is, the counter counts the XNOR logic operation results of the vectors (or the feature vector) of the person x with the vectors (or the feature vector) and the mask vectors of the person a. The memory device 1000 outputs the number of the person (object) whose counts exceeding a threshold value, which means the person matches with the person x. In other possible embodiment, the memory device 1000 outputs the respective operation results of all the stored persons (objects) to an external device and the external device finds out the matched person (object).

Figure 11:
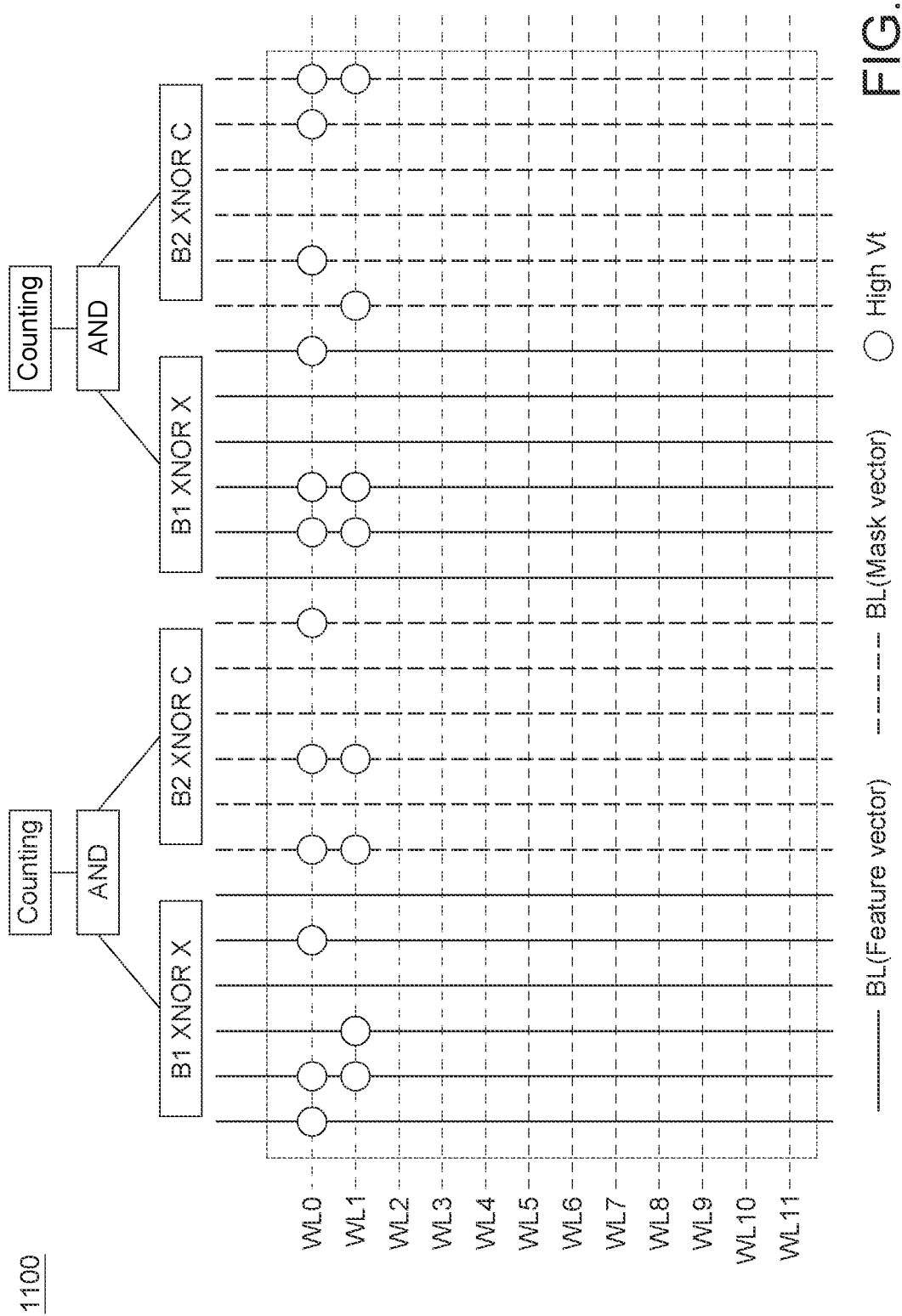
FIG. 11 shows another diagram of the memory device implementing the data search method according to the fourth embodiment of the application.

FIG. 11 shows another diagram of the memory device implementing the data search method according to the fourth embodiment of the application.

In FIG. 11, the feature vectors (B1) and the mask vectors (B2) of the same object may be stored on the same word line. For example, the feature vectors (B1) of the object b may be stored on the first 512 memory cells of the word line WL0; and the mask vectors (B2) of the object b may be stored on the next 512 memory cells of the word line WL0. Others are so on.

Further, for easy design, a reference vector C is introduced, wherein the elements of the reference vector C are all 1, C=(1, 1, 1, 1, 1). The reference vector C is subsequent to the vectors (or the feature vector) of the person x.

For example, in comparing or recognizing the persons (the objects) stored in the memory device 1100 with the person x fetched by the camera, the vectors (or the feature vectors) of the person x and the reference vector C are input into the memory device 1100 via the bit lines. Then, in comparing the object (person) a stored in the memory device 1000 with the object (person) x, it performs logic operations on the vectors (or the feature vector) X of the person x, the reference vector C, the vectors (or the feature vector) B1 and the mask vectors B2 of the person a. The logic operations are for example but not limited by, XNOR logic operations "((B1 XNOR X) AND (B2 XNOR C))".

In here, there are 512 dimensions, which is not to limit the application. The vectors (or the feature vector) of the person a are stored in 512 memory cells. The logic operation results are sent to the counter via 512 bit lines. That is, the counter counts the XNOR logic operation results of the vectors (or the feature vector) X of the person x, the reference vector C, the vectors (or the feature vector) and the mask vectors of the person a. The memory device 1100 outputs the number of the person (object) whose counts exceeding a threshold value, which means the person matches with the person x. Alternatively, the memory device 1100 outputs the respective counts of all the stored persons (objects) to an external device and the external device finds out the matched person (object). In one embodiment of the application, B2 XNOR C=B2; and thus (B1 XNOR X) AND (B2 XNOR C)=(B1 XNOR X) AND B2.

The memory device in FIG. 11 may require fewer counters.

In the above embodiments of the application, a plurality of object data in the database are vectored by the model into object vectors (or feature vectors), which are high dimension low resolution. By so, simple calculation and low storage capacity requirements are achieved. Further, the object vectors are partitioned (i.e. compressed or digitalized), for example but not limited by, dimension equal-quantity partition.

In the above embodiments of the application, via introducing the mask vectors, the vectors which are low confidence are masked to improve match confidence.

In the above embodiments of the application, the memory cell storing the vectors (or the feature vectors) may be multilevel cell (MLC) for storing more information in comparison and recognition; and data (for example, each dimension vector of the feature vector of the search data) on each of the bit lines are also multilevel. That is, the bit lines are multilevel bit lines. This is also referred as multilevel operations.

In other possible embodiments of the application, the memory cell storing the vectors (or the feature vectors) may be single-level cell (SLC); and data (for example, each dimension vector of the feature vector of the search data) on each of the bit lines are also single-level. That is, the bit lines are single-level bit lines. This is also referred as single-level operations. But, in other possible embodiments of the application, a plurality of single-level storage units (memory cells) and a plurality of single-level bit lines are combined to implement the multilevel operations.

Figure 12:
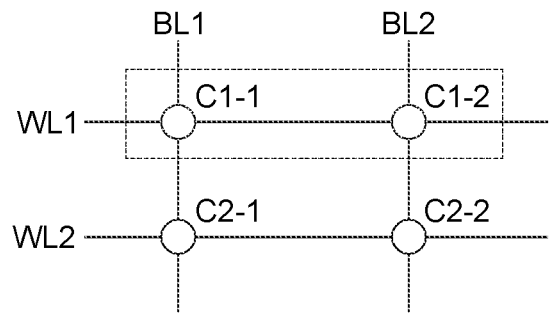
FIG. 12 shows diagram for combining single-level memory cells and single-level bit lines for implementing multi-level operations according to one embodiment of the application.

FIG. 12 shows diagram for combining single-level memory cells and single-level bit lines for implementing multi-level operations according to one embodiment of the application. As shown in FIG. 12, the memory cells C1-1, C1-2, C2-1 and C2-2 are single-level cells; and data on the bit lines BL1 and BL2 are single-level. WL1 and WL2 indicate the word lines.

In FIG. 12, two single-level bit lines are used to transmit information on the same dimension of the search data. For example but not limited by, one dimension vector has four states; and the bit lines BL1 and BL2 are used to transmit four states of the first dimension of the feature vector of the search data and so on.

Similarly, in FIG. 12, two single-level memory cells are used to store information on the same dimension of the objects of the database. For example but not limited by, one dimension vector has four states; and the memory cells C1-1 and C1-2 are used to store four states of the first dimension of the feature vector (or the mask vector) of the object of the database and so on.

The logic operations are as follows. For example, in the above embodiment, the XNOR logic operation (B1 XNOR X) is implemented as (C1-1 XNOR BL1) AND (C1-2 XNOR BL2). Others are so on.

The match states are as follows.

|  | BL1 = 1, BL2 = 0 | BL1 = 0, BL2 = 1 | BL1 = 1, BL2 = 1 | BL1 = 1, BL2 = 0 |
|---|---|---|---|---|
| C1-1 = 1, C1-2 = 0 | Match | Mismatch | Mismatch | Mismatch |
| C1-1 = 0, C1-2 = 1 | Mismatch | Match | Mismatch | Mismatch |
| C1-1 = 1, C1-2 = 1 | Mismatch | Mismatch | Match | Mismatch |
| C1-1 = 0, C1-2 = 0 | Mismatch | Mismatch | Mismatch | Match |

Figure 13:
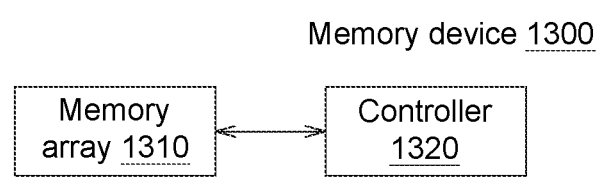
FIG. 13 shows a functional block diagram of a memory device according to one embodiment of the application.

FIG. 13 shows a functional block diagram of a memory device according to one embodiment of the application. The memory device 1300 includes: a memory array 1310; and a controller 1320, coupled to the memory array 1310. The controller 1320 is configured for: based on a recorded compression mode, vectoring a search data to generate a search data vector, and based on the recorded compression mode, compressing the search data and a plurality of objects in a database, the plurality of objects of the database are stored in the memory array 1310; setting a search condition; searching the objects of the database by the search data vector to determine whether the search data is matched with the objects of the database of the memory array 1310; and recording and outputting at least one matched object of the database, the at least one matched object matched with the search data. The memory array 1310 may be the same or similar to the memory array 900A.

In the above embodiments of the application, the memory device may be non-volatile memory, or volatile NAND flash memory.

The memory device and the data search method in the above embodiments of the application may be applied in edge devices.

Thus, the memory device and the data search method in the above embodiments of the application may achieve simple calculation but high analysis confidence.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A memory device comprising:
a plurality of word lines;
a plurality of bit lines; and
a plurality of memory cells on a plurality of intersections between the word lines and the bit lines;
wherein
a first feature vector of a first object is stored on the memory cells on a first word line among the word lines;
a feature vector of a search data is input into the memory cells on the first word line of the memory device via the bit lines;
logic operations on the feature vector of the search data with the first feature vector of the first object are performed to generate a plurality of first logic operation results for determining whether the search data is matched with the first object,
wherein, a first word line group of the word lines are for storing a plurality of feature vectors of a plurality of objects, and a second word line group of the word lines are for storing a plurality of mask vectors of the plurality of objects, wherein the plurality of mask vectors of the plurality of objects are generated based on the mask ratio, wherein, the logic operations are performed on the feature vector of the search data, the first feature vector of the first object and a first mask vector of the plurality of mask vectors corresponding to the first object, to generate the plurality of first logic operation results for determining whether the search data is matched with the first object.

2. The memory device according to claim 1, further including a counter coupled to the bit lines, for counting the first logic operation results returned from the bit lines to generate a first count, wherein a first number of the first object is output, or the first count of the first object is output.

3. The memory device according to claim 1, wherein a first mask vector of the first object is stored in the memory cells on the first word line among the word lines;

a reference vector is input into the first word line via the bit lines;

logic operations are performed on the feature vector of the search data, the first feature vector of the first object, the first mask vector of the first object and the reference vector to generate the plurality of first logic operation results for determining whether the search data is matched with the first object.

4. The memory device according to claim 1, wherein the bit lines are multi-level bit lines; and the memory cells are multi-level memory cells.

5. The memory device according to claim 1, wherein the bit lines are single-level bit lines; and the memory cells are single-level memory cells.

6. The memory device according to claim 5, wherein at least two of the bit lines are used to transmit multi-state information of the same dimension of the feature vector of the search data; and at least two of the memory cells are used to store multi-state information of the same dimension of the first feature vector of the first object.

7. The memory device according to claim 1, wherein a second feature vector of a second object is stored in other memory cells on the first word line.

8. The memory device according to claim 1, further including a page buffer coupled to the bit lines, the page buffer including a plurality of operation units for executing logic operations.

9. The memory device according to claim 1, wherein each dimension of the feature vector of the search data has several vector states and the number of the vector states is equal to or lower than 3 bits or 8 bits; and each dimension of the feature vector of the first object has several vector states and the number of the vector states is equal to or lower than 3 bits or 8 bits.

* * * * *